July 14, 1936. S. J. HARLEY 2,047,868
SLIDE BEARING
Filed June 27, 1934
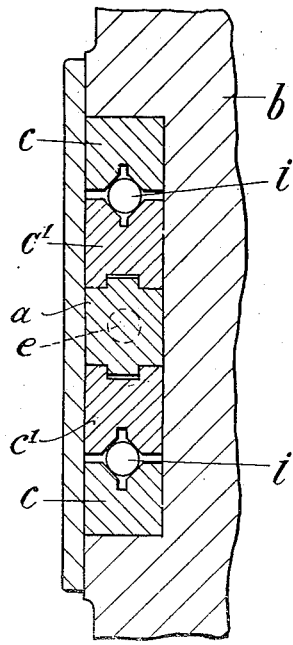
Fig.2.
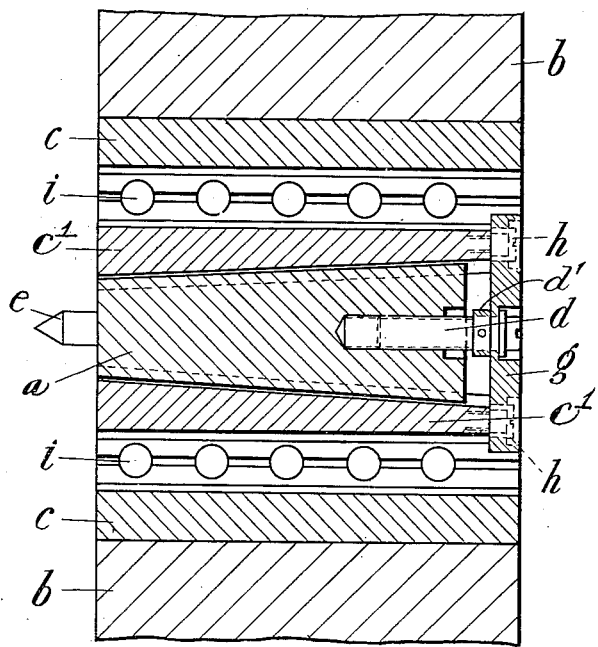
Fig.1.
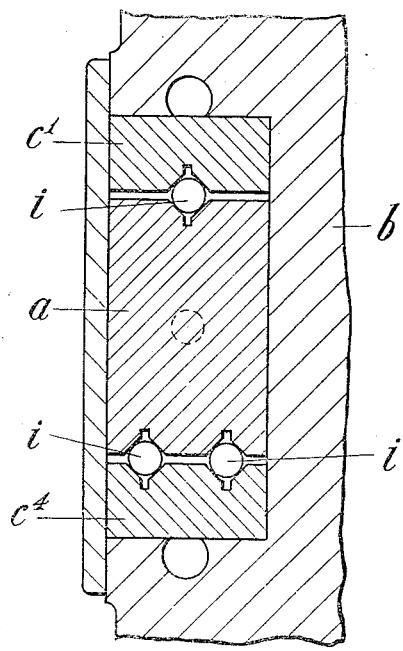
Fig.3.

Patented July 14, 1936

2,047,868

UNITED STATES PATENT OFFICE 2,047,868

SLIDE BEARING

Stanley Jaffa Harley, Stivichall, Coventry, England

Application June 27, 1934, Serial No. 732,695
In Great Britain June 29, 1933

2 Claims. (Cl. 308—6)

This invention is applicable in all cases where a sliding member, irrespective of its function and the manner in which it is operated, is required to be extremely sensitive to movement, and, if necessary, to be capable of delicate adjustment either for the purpose of maintaining its sensibility to movement or for functional purposes.

The invention is particularly applicable to slides used in precision work where, as for example, in form grinding, the slide carrying the wheel cutter or the work-piece is required to work with a maximum freedom of movement and with a high degree of accuracy.

According to the present invention true and free movement of the sliding member is obtained by mounting the same upon or between a pair of parallel ball bearings arranged in the plane of movement of said member between the latter and a relatively stationary member, means being provided for taking up adjustment for wear at the bearing surfaces preferably in such a manner as to maintain centrality of the sliding member.

The adjusting device or devices may be applied either externally or internally of the sliding member, that is to say, either inwardly from outside the ball bearings or outwardly from between them.

In the accompanying drawing,

Figures 1 and 2 are longitudinal and transverse sectional views respectively of the improved mounting for slides.

Figure 3 is a cross-sectional view depicting a further development of the invention.

In the construction, shown in Figures 1 and 2, taper or wedge shaped ball bearing races or guides $c^1$, $c^1$ are arranged between the relatively movable and correspondingly tapered slide $a$ and the parallel fixed ball bearing races or guides $c$, $c$ in the housing $b$ and are connected together at one end by a cross-head $g$. Adjustment for wear of the bearings is obtained by means of a screw $d$ working in a tapped hole in the side $a$. Rotation of this screw in either direction causes relative longitudinal movement to take place between the races or guides $c^1$, $c^1$ and the slide $a$, the head of the screw, when rotated in one direction, bearing against the outer face of the cross-head, and a collar $d^1$ fixed to the screw taking a bearing against the inside face of the cross-head when the screw is turned in the other direction. The co-action between the adjacent inclined faces of the slide $a$ and races or guides $c^1$, $c^1$ consequent upon the relative longitudinal movement, causes the said races or guides to be simultaneously moved laterally or in a direction at right angles to their endwise movement towards or away from the fixed races or guides $c$, $c$. Where, as shown, the two operative faces of the slide $a$ are both inclined to an equal degree the slide will always retain a central position. The said slide may carry a tool, such as the diamond $e$ for use, for example, in truing grinding wheels.

It is not intended to limit the application of the invention to the particular cases shown, for example, as will be seen in Figure 3, one of the two ball bearing guides $c^4$ and the adjacent edge of the slide $a$ may have a plurality of parallel ball races.

It will be appreciated that the invention offers the like advantages where $a$ is the fixed member and $b$ the sliding member.

In every case the ball races in the slide $a$ and in the bearing guides are hardened, ground and lapped and, as shown, are preferably of a V-shape in cross-section so that the hardened balls $i$, which may be carried in spaced relationship by means of a cage, in any suitable manner, each have a four-point contact with their races.

I claim:—

1. In combination a divided sliding member having parallel ball bearing races at opposite sides, a relatively stationary supporting member therefor, ball bearing guides in said supporting member having complementary ball races and means arranged between the parts of said sliding member and operating outwardly thereon to adjust them towards and away from said guides.

2. In combination a sliding member divided into two parts in the direction of its movement and having parallel ball bearing races in the outer edges thereof, a relatively stationary supporting member therefor having complementary ball races, a taper gib arranged between the correspondingly inclined inner edges of said divided member and means for adjusting said gib in the direction of its length between the parts of said sliding member.

STANLEY JAFFA HARLEY.